(12) United States Patent
Sakazaki

(10) Patent No.: US 11,339,835 B2
(45) Date of Patent: May 24, 2022

(54) DRIVE FORCE TRANSFER DEVICE

(71) Applicant: JTEKT CORPORATION, Osaka (JP)

(72) Inventor: Koudai Sakazaki, Kariya (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/065,050

(22) Filed: Oct. 7, 2020

(65) Prior Publication Data

US 2021/0108685 A1 Apr. 15, 2021

(30) Foreign Application Priority Data

Oct. 11, 2019 (JP) .............................. JP2019-187856

(51) Int. Cl.
| | | |
|---|---|---|
| *F16H 1/32* | (2006.01) | |
| *H02K 7/108* | (2006.01) | |
| *F16D 25/0638* | (2006.01) | |
| *F16D 25/12* | (2006.01) | |
| *F16D 48/02* | (2006.01) | |

(52) U.S. Cl.
CPC ....... *F16D 25/0638* (2013.01); *F16D 25/123* (2013.01); *F16D 25/14* (2013.01)

(58) Field of Classification Search
CPC .... F16D 25/0638; F16D 25/123; F16D 25/14; F16D 48/0206; F16D 48/064; F16D 2048/029; F16D 2500/3056; F16D 2500/30803; F16D 2500/30405; F16D 25/10

See application file for complete search history.

(56) References Cited

U.S. PATENT DOCUMENTS

| | | | | |
|---|---|---|---|---|
| 6,341,679 | B1 * | 1/2002 | Abe ...................... | F16H 61/143 192/3.29 |
| 8,660,766 | B2 * | 2/2014 | Ergun ................... | F16D 48/064 701/68 |
| 2006/0131122 | A1 * | 6/2006 | Burns ................... | F16D 25/123 192/70.12 |
| 2013/0096794 | A1 * | 4/2013 | Febrer ................... | F16D 48/06 701/69 |
| 2013/0206533 | A1 * | 8/2013 | Mepham .............. | F16D 48/0206 192/48.601 |
| 2013/0341544 | A1 * | 12/2013 | Murakami .............. | F16K 31/06 251/129.15 |

(Continued)

FOREIGN PATENT DOCUMENTS

JP 2009-97662 A 5/2009

*Primary Examiner* — Charles A Fox
*Assistant Examiner* — Farhana Pervin
(74) *Attorney, Agent, or Firm* — Oblon, McClelland, Maier & Neustadt, L.L.P.

(57) ABSTRACT

A drive force transfer device includes a multi-plate clutch that transfers a drive force using a friction force generated between a plurality of clutch plates; a housing that houses the multi-plate clutch; a piston that presses the multi-plate clutch using a hydraulic pressure of operating oil supplied to a hydraulic chamber provided in the housing; a hydraulic unit configured to supply the operating oil to the hydraulic chamber; and a control device configured to control the hydraulic unit, the control device being configured to correct a control amount for the hydraulic unit based on a result of a temperature estimation based on operation of the hydraulic unit.

3 Claims, 7 Drawing Sheets

(56) References Cited

U.S. PATENT DOCUMENTS

| | | | |
|---|---|---|---|
| 2014/0027236 A1* | 1/2014 | Ando | F16D 13/385 |
| | | | 192/48.2 |
| 2017/0023075 A1* | 1/2017 | Nozu | B60K 17/35 |
| 2017/0261049 A1* | 9/2017 | Nozu | F16D 13/52 |
| 2018/0099563 A1* | 4/2018 | Nozu | F16D 11/14 |

\* cited by examiner

DRIVE FORCE TRANSFER DEVICE

CROSS-REFERENCE TO RELATED APPLICATION

This application claims priority to Japanese Patent Application No. 2019-187856 filed on Oct. 11, 2019, incorporated herein by reference in its entirety.

BACKGROUND

1. Technical Field

The disclosure relates to a drive force transfer device mounted on a vehicle to transfer a drive force of a drive source of the vehicle to the wheel side.

2. Description of Related Art

In some four-wheel-drive vehicles according to related art that include front wheels as main drive wheels and rear wheels as auxiliary drive wheels, for example, a drive force of a drive source such as an engine is transferred to the rear wheels via a drive force transfer device that includes a multi-plate clutch. In such drive force transfer devices, frictional sliding between clutch plates of the multi-plate clutch is lubricated using lubricating oil in order to restrain wear of the clutch plates and heat generation by the clutch plates.

Japanese Unexamined Patent Application Publication No. 2009-97662 (JP 2009-97662 A) describes a drive force transfer device configured to estimate the temperature of a torque coupling including a multi-plate clutch based on the outside air temperature, correct a control target value for the torque coupling based on the estimated temperature, and correct the value of the outside air temperature which is used to estimate the temperature of the torque coupling based on the elapsed time from stop of an engine until restart of the engine and the temperature of the coolant of the engine, in order to reduce the possibility that the transferred drive force increases to an unnecessarily large value due to an increase in the viscosity of lubricating oil particularly at low temperatures.

SUMMARY

In recent years, a high precision has been required to control a drive force to be transferred to auxiliary drive wheels of a four-wheel-drive vehicle as compared to the related art, due to the advancement of electronic control for vehicles such as traction control for restraining free rotation of wheels and stability control for restraining side skidding during turning.

The disclosure provides a drive force transfer device that is capable of improving the precision of a drive force transferred through a multi-plate clutch.

An aspect of the disclosure relates to a drive force transfer device including a multi-plate clutch that transfers a drive force using a friction force generated between a plurality of clutch plates; a housing that houses the multi-plate clutch; a piston that presses the multi-plate clutch using a hydraulic pressure of operating oil supplied to a hydraulic chamber provided in the housing; a hydraulic unit configured to supply the operating oil to the hydraulic chamber; and a control device configured to control the hydraulic unit. The control device corrects a control amount for the hydraulic unit based on a result of a temperature estimation based on operation of the hydraulic unit.

With the drive force transfer device according to the disclosure, it is possible to improve the precision of the drive force transferred through a multi-plate clutch.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A first embodiment of the disclosure will be described with reference to FIGS. 1 to 8. Embodiments described below are provided as specific examples for carrying out the disclosure. The technical scope of the disclosure is not limited to the embodiments.

Figure 1:
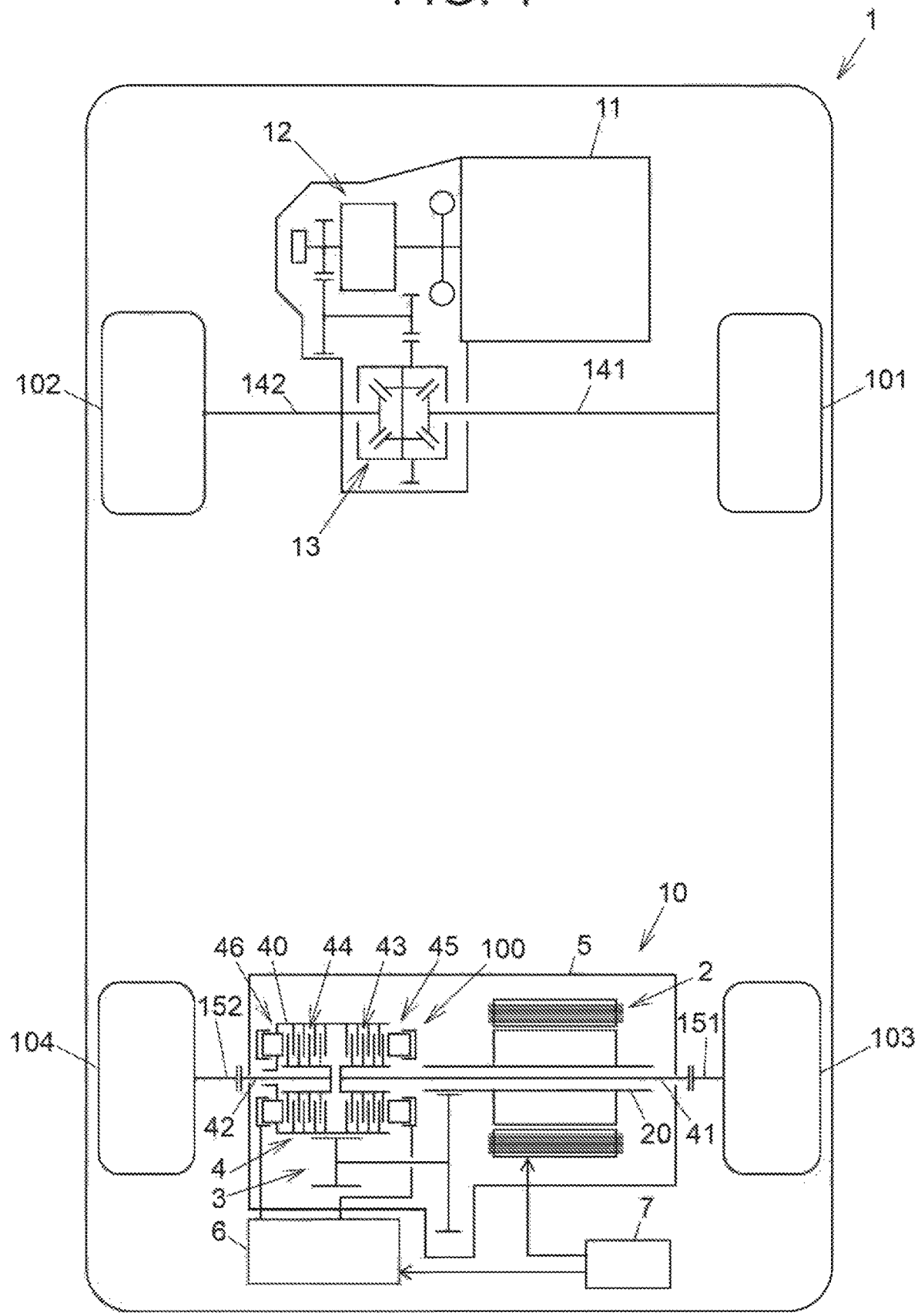
FIG. 1 is a schematic diagram illustrating an example of a schematic configuration of a four-wheel-drive vehicle on which a drive device is mounted according to an embodiment of the disclosure.

FIG. 1 is a schematic diagram illustrating an example of a schematic configuration of a four-wheel-drive vehicle on which a drive device is mounted according to a first embodiment of the disclosure. A four-wheel-drive vehicle 1 includes a right front wheel 101 and a left front wheel 102 as main drive wheels driven by a drive force of an engine 11 as a main drive source, and a right rear wheel 103 and a left rear wheel 104 as auxiliary drive wheels driven by a drive device 10 that includes a drive motor 2 as an auxiliary drive source. A wheel speed sensor is attached for each of the right front wheel 101 and the left front wheel 102 and the right rear wheel 103 and the left rear wheel 104.

The drive force of the engine 11 is transferred from a transmission 12 to a differential device 13, and distributed from the differential device 13 to the right front wheel 101 and the left front wheel 102 via right and left drive shafts 141 and 142, respectively. A drive force is transferred from the drive device 10 to the right rear wheel 103 and the left rear wheel 104 via right and left drive shafts 151 and 152, respectively. The main drive source may be a high-output electric motor, and may be of a so-called hybrid type in which an engine and a high-output electric motor are combined with each other.

The drive device 10 includes a drive motor 2; a speed reduction mechanism 3 that reduces the speed of rotation of an output shaft 20 of the drive motor 2; a drive force distribution mechanism 4 that distributes and outputs a drive force input from the drive motor 2 via the speed reduction mechanism 3; a housing 5 that houses these components; a hydraulic unit 6 that supplies operating oil to the drive force distribution mechanism 4; and a control device 7 that controls the drive motor 2 and the hydraulic unit 6. Among these, the drive force distribution mechanism 4, the housing 5, the hydraulic unit 6, and the control device 7 constitute a drive force transfer device 100 that transfers a drive force of the drive motor 2 to the right and left drive shafts 151 and 152.

Figure 2:
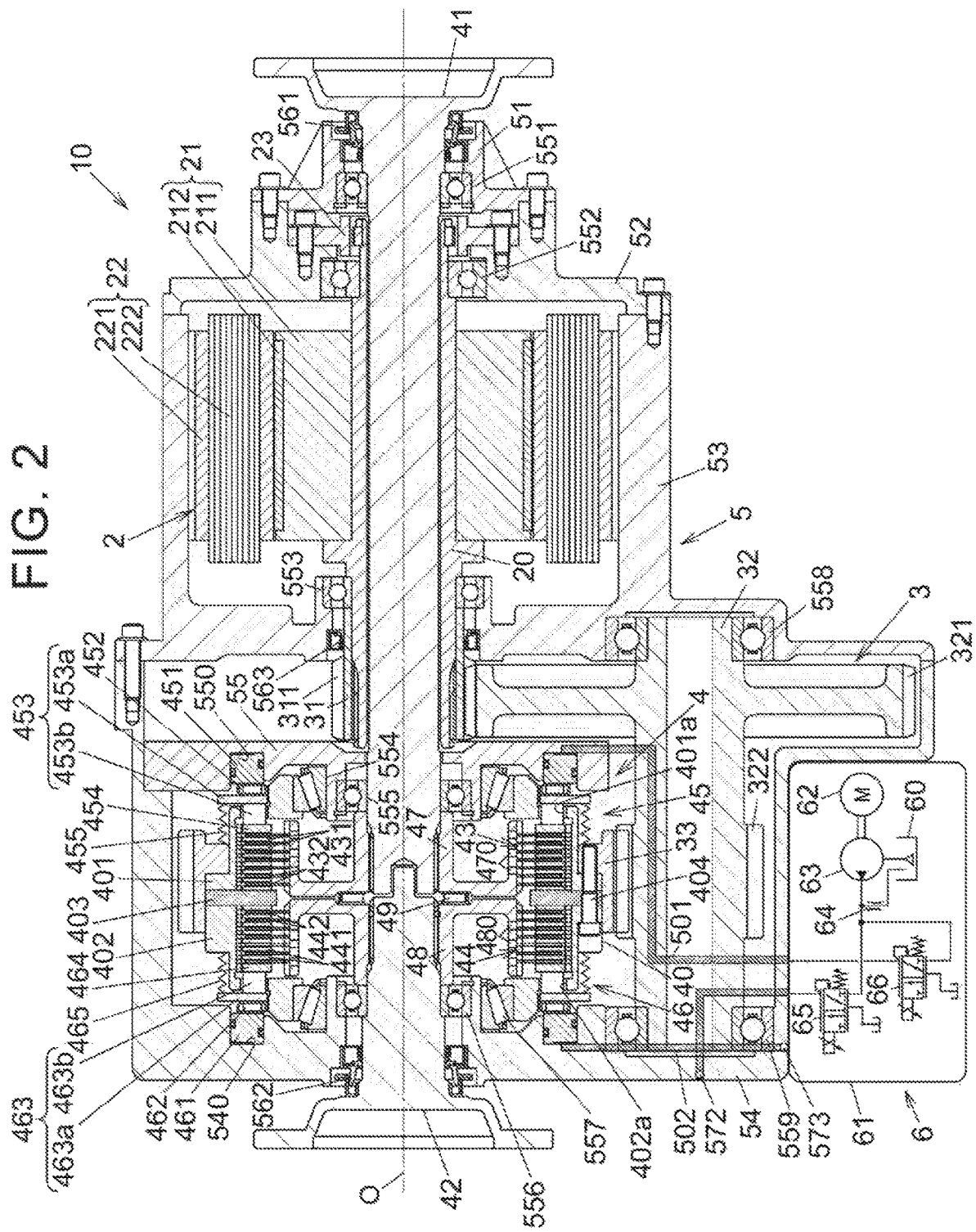
FIG. 2 is a sectional view illustrating an example of the configuration of the drive device.

FIG. 2 is a sectional view illustrating an example of the configuration of the drive device 10. The left side of FIG. 2 corresponds to the left side of the four-wheel-drive vehicle 1 in the vehicle right-left direction. The right side of FIG. 2 corresponds to the right side of the four-wheel-drive vehicle 1 in the vehicle right-left direction. The housing 5 includes first to fifth housing members 51 to 55 formed by die casting and made of an aluminum alloy. The housing members 51 to 55 are fixed to each other by a plurality of bolts. The housing 5 is fixed to the vehicle body of the four-wheel-drive vehicle 1.

The drive motor 2 is an electric motor to which a motor current is supplied from the control device 7, and includes an output shaft 20 provided in a hollow tube shape; a rotor 21 that rotates together with the output shaft 20; a stator 22 disposed at the outer periphery of the rotor 21; and a rotation sensor 23 that detects rotation of the output shaft 20. The rotor 21 includes a rotor core 211 and a plurality of permanent magnets 212 fixed to the rotor core 211. The stator 22 includes a stator core 221 and windings 222 for a plurality of phases wound around the stator core 221. A first output rotary member 41 of the drive force distribution mechanism 4 is inserted through the inside of the output shaft 20. Three-phase alternating current (AC) motor currents, for example, are supplied from the control device 7 to the windings 222 for the plurality of phases to rotate the rotor 21 with respect to the stator 22 with torque that matches the magnitude of the motor currents.

The speed reduction mechanism 3 is configured to include a tubular pinion gear 31 fitted to an outer periphery of an end portion of the output shaft 20 of the drive motor 2; a speed reduction gear 32 that includes a large-diameter gear portion 321 and a small-diameter gear portion 322; and a ring gear 33 meshed with the small-diameter gear portion 322. The pinion gear 31 is spline-fitted to the output shaft 20 to rotate together with the output shaft 20. A gear portion 311 provided at the outer periphery of the pinion gear 31 is meshed with the large-diameter gear portion 321 of the speed reduction gear 32. A drive force of the drive motor 2 is input from the ring gear 33 to an input rotary member 40 of the drive force distribution mechanism 4.

The drive force distribution mechanism 4 includes an input rotary member 40 that receives a drive force of the drive motor 2 via the speed reduction mechanism 3; first and second output rotary members 41 and 42 provided coaxially with the input rotary member 40 so as to be relatively rotatable; a first multi-plate clutch 43 disposed between the input rotary member 40 and the first output rotary member 41; a second multi-plate clutch 44 disposed between the input rotary member 40 and the second output rotary member 42; a first pressing mechanism 45 that presses the first multi-plate clutch 43; and a second pressing mechanism 46 that presses the second multi-plate clutch 44.

In the present embodiment, in addition, a first clutch hub 47 is interposed between the first multi-plate clutch 43 and the first output rotary member 41, and a second clutch hub 48 is interposed between the second multi-plate clutch 44 and the second output rotary member 42. The first output rotary member 41 is spline-fitted to the first clutch hub 47 to rotate together with the first clutch hub 47. The second output rotary member 42 is spline-fitted to the second clutch hub 48 to rotate together with the second clutch hub 48. A thrust bearing 49 is disposed between the first clutch hub 47 and the second clutch hub 48.

A plurality of first output clutch plates 432 may be spline-engaged with the first output rotary member 41 with the first clutch hub 47 omitted. A plurality of second output clutch plates 442 may be spline-engaged with the second output rotary member 42 with the second clutch hub 48 omitted.

The input rotary member 40, the first output rotary member 41, and the second output rotary member 42 are rotatable relative to each other about a rotational axis O that extends along the vehicle right-left direction. Each of the first multi-plate clutch 43 and the second multi-plate clutch 44 is a multi-plate clutch of a wet type in which frictional sliding between clutch plates to be discussed later is lubricated with lubricating oil sealed in the housing 5. Rolling bearings 551 to 559 that smooth rotation of various portions, and seal members 561 to 563 that restrain leakage of lubricating oil and entry of foreign matter are disposed at appropriate locations in the drive device 10. Hereinafter, the direction which is parallel to the rotational axis O will be referred to as an "axial direction".

The input rotary member 40 includes a first clutch drum 401 disposed at the outer periphery of the first clutch hub 47; a second clutch drum 402 disposed at the outer periphery of the second clutch hub 48; a center plate 403 disposed between the first clutch drum 401 and the second clutch drum 402; and a plurality of bolts 404. The bolts 404 couple the first clutch drum 401, the second clutch drum 402, and the center plate 403 such that the first clutch drum 401, the second clutch drum 402, and the center plate 403 are not rotatable relative to each other, and fixes these components to the ring gear 33. One of the bolts 404 is illustrated in FIG. 2.

The first multi-plate clutch 43 includes a plurality of first input clutch plates 431 that rotates together with the first clutch drum 401 and a plurality of first output clutch plates 432 that rotates together with the first clutch hub 47. The first input clutch plates 431 and the first output clutch plates 432 are disposed alternately along the axial direction. The first input clutch plates 431 are movable in the axial direction and relatively non-rotatable with respect to the first clutch drum 401 through spline engagement with the first clutch drum 401. The first output clutch plates 432 are movable in the axial direction and relatively non-rotatable with respect to the first clutch hub 47 through spline engagement with the first clutch hub 47.

The first multi-plate clutch 43 transfers a drive force from the first clutch drum 401 to the first clutch hub 47 using a friction force generated between the first input clutch plates 431 and the first output clutch plates 432. Frictional sliding between the first input clutch plates 431 and the first output clutch plates 432 is lubricated with lubricating oil introduced through a plurality of lubricating oil introduction holes 470 provided in the first clutch hub 47.

The second multi-plate clutch 44 includes a plurality of second input clutch plates 441 that rotates together with the second clutch drum 402 and a plurality of second output clutch plates 442 that rotates together with the second clutch hub 48. The second input clutch plates 441 and the second output clutch plates 442 are disposed alternately along the axial direction. The second input clutch plates 441 are movable in the axial direction and relatively non-rotatable with respect to the second clutch drum 402 through spline engagement with the second clutch drum 402. The second output clutch plates 442 are movable in the axial direction and relatively non-rotatable with respect to the second clutch hub 48 through spline engagement with the second clutch hub 48.

The second multi-plate clutch 44 transfers a drive force from the second clutch drum 402 to the second clutch hub 48 using a friction force generated between the second input clutch plates 441 and the second output clutch plates 442. Frictional sliding between the second input clutch plates 441 and the second output clutch plates 442 is lubricated with lubricating oil introduced through a plurality of lubricating oil introduction holes 480 provided in the second clutch hub 48.

The first pressing mechanism 45 includes a ring-shaped piston 451 that receives a hydraulic pressure supplied from the hydraulic unit 6; a thrust roller bearing 452 disposed side by side with the piston 451 in the axial direction; a pressing member 453 that receives a pressing force of the piston 451 via the thrust roller bearing 452; a pressing plate 454 disposed in the inner side of the first clutch drum 401; and a return spring 455 that contacts the pressing member 453.

A part of the piston 451 in the axial direction is housed in a first hydraulic chamber 550 provided in an annular shape in the fifth housing member 55. The piston 451 presses the first multi-plate clutch 43 using the pressure of operating oil supplied from the hydraulic unit 6 to the first hydraulic chamber 550. The pressing member 453 integrally includes an annular portion 453a provided in a circular ring shape and a plurality of columnar pressing projections 453b that projects in the axial direction from the annular portion 453a toward the first multi-plate clutch 43. The pressing projections 453b are inserted through respective through holes 401a provided in the first clutch drum 401. The distal end portions of the pressing projections 453b contact the pressing plate 454. The return spring 455 contacts the annular portion 453a to bias (i.e., urge) the pressing member 453 toward the fifth housing member 55.

The second pressing mechanism 46 includes a ring-shaped piston 461 that receives a hydraulic pressure supplied from the hydraulic unit 6; a thrust roller bearing 462 disposed side by side with the piston 461 in the axial direction; a pressing member 463 that receives a pressing force of the piston 461 via the thrust roller bearing 462; a pressing plate 464 disposed in the inner side of the second clutch drum 402; and a return spring 465 that contacts the pressing member 463.

A part of the piston 461 in the axial direction is housed in a second hydraulic chamber 540 provided in an annular shape in the fourth housing member 54. The piston 461 presses the second multi-plate clutch 44 using the pressure of operating oil supplied from the hydraulic unit 6 to the second hydraulic chamber 540. The pressing member 463 integrally includes an annular portion 463a provided in a circular ring shape and a plurality of columnar pressing projections 463b that projects in the axial direction from the annular portion 463a toward the second multi-plate clutch 44. The pressing projections 463b are inserted through respective through holes 402a provided in the second clutch drum 402. The distal end portions of the pressing projections 463b contact the pressing plate 464. The return spring 465 contacts the annular portion 463a to bias (i.e., urge) the pressing member 463 toward the fourth housing member 54.

Figure 3A:
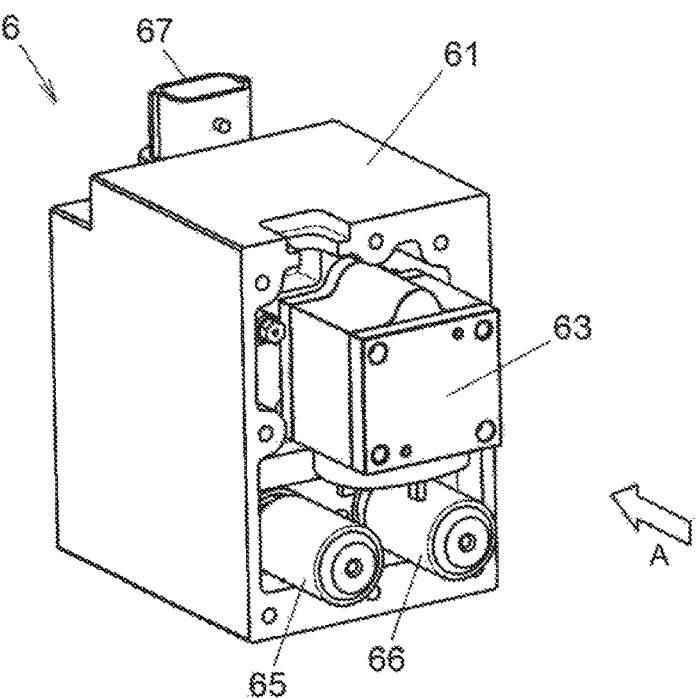
FIG. 3A illustrates the appearance of an example of a hydraulic unit.
Figure 3B:
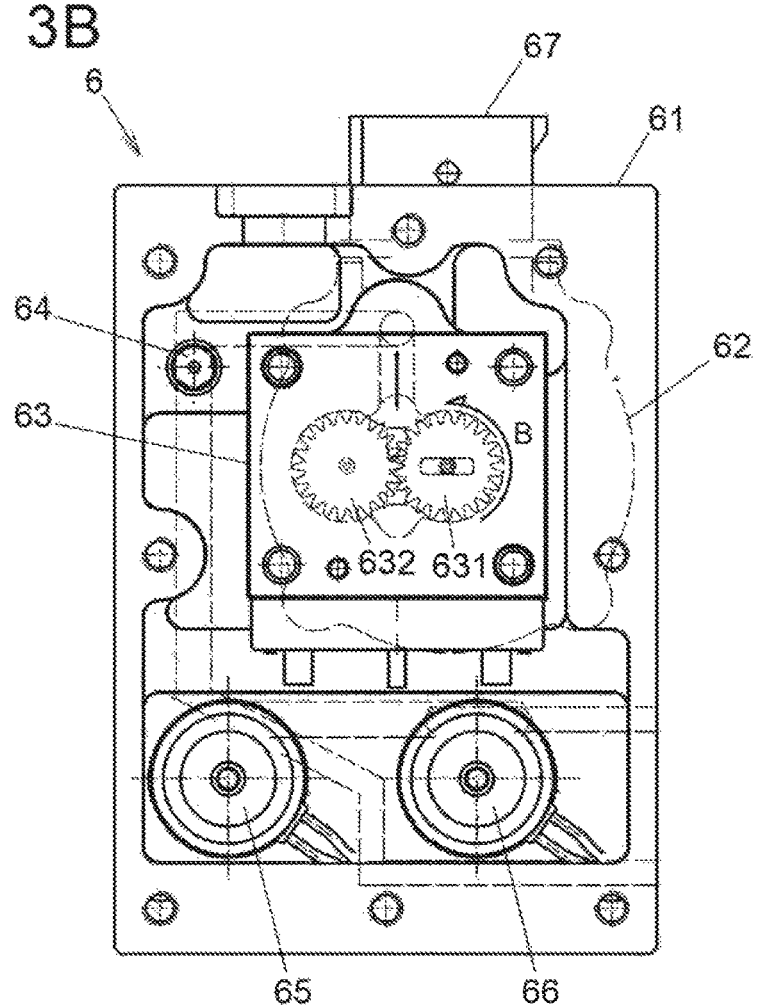
FIG. 3B illustrates the example of the hydraulic unit as seen along the arrow A in FIG. 3A, illustrating the internal structure thereof with dashed lines.

FIG. 3A illustrates the appearance of an example of the hydraulic unit 6. FIG. 3B illustrates the hydraulic unit 6 as seen along the arrow A in FIG. 3A, and illustrates the internal structure thereof with dashed lines. The hydraulic unit 6 includes a case member 61, a pump driving electric motor 62 that generates torque that matches a current supplied from the control device 7, a hydraulic pump 63 rotationally driven by the electric motor 62, a relief valve 64, first and second electromagnetic valves 65 and 66, and a connector 67 for electrical connection with the control device 7.

The case member 61 is formed by die casting and made of an aluminum alloy, and fixed to the fourth housing member 54 by a bolt (not illustrated). The electric motor 62 is a three-phase motor to which currents for U-phase, V-phase, and W-phase are supplied from the control device 7, and generates torque with a magnitude that matches the supplied phase currents to drive the hydraulic pump 63. In addition, the electric motor 62 includes a rotation sensor. The control device 7 can detect the rotational speed of the electric motor 62 using a signal from the rotation sensor.

The hydraulic pump 63 draws up operating oil from a reservoir 60 (see FIG. 2) provided in the case member 61 to discharge the operating oil. In the present embodiment, the hydraulic pump 63 is an external gear pump, and includes a drive gear 631 that rotates using torque of the electric motor 62 and a driven gear 632 meshed with the drive gear 631 to be rotated as illustrated in FIG. 3B. In FIG. 3B, the rotational direction of the drive gear 631 is indicated by the arrow B. The hydraulic pump 63 is not limited to an external gear pump, and may be an internal gear pump or a vane pump, for example. The relief valve 64 is a fixed throttle valve that returns a part of the discharged operating oil to the reservoir 60.

The first electromagnetic valve 65 is disposed in a path that extends from the hydraulic pump 63 to the first hydraulic chamber 550. The second electromagnetic valve 66 is disposed in a path that extends from the hydraulic pump 63 to the second hydraulic chamber 540. The first electromagnetic valve 65 is a pressure control valve that regulates the pressure of operating oil supplied to the first hydraulic chamber 550. The second electromagnetic valve 66 is a pressure control valve that regulates the pressure of operating oil supplied to the second hydraulic chamber 540. The valve opening degree of each of the first and second electromagnetic valves 65 and 66 is varied in accordance with a current supplied from the control device 7.

Figure 4:
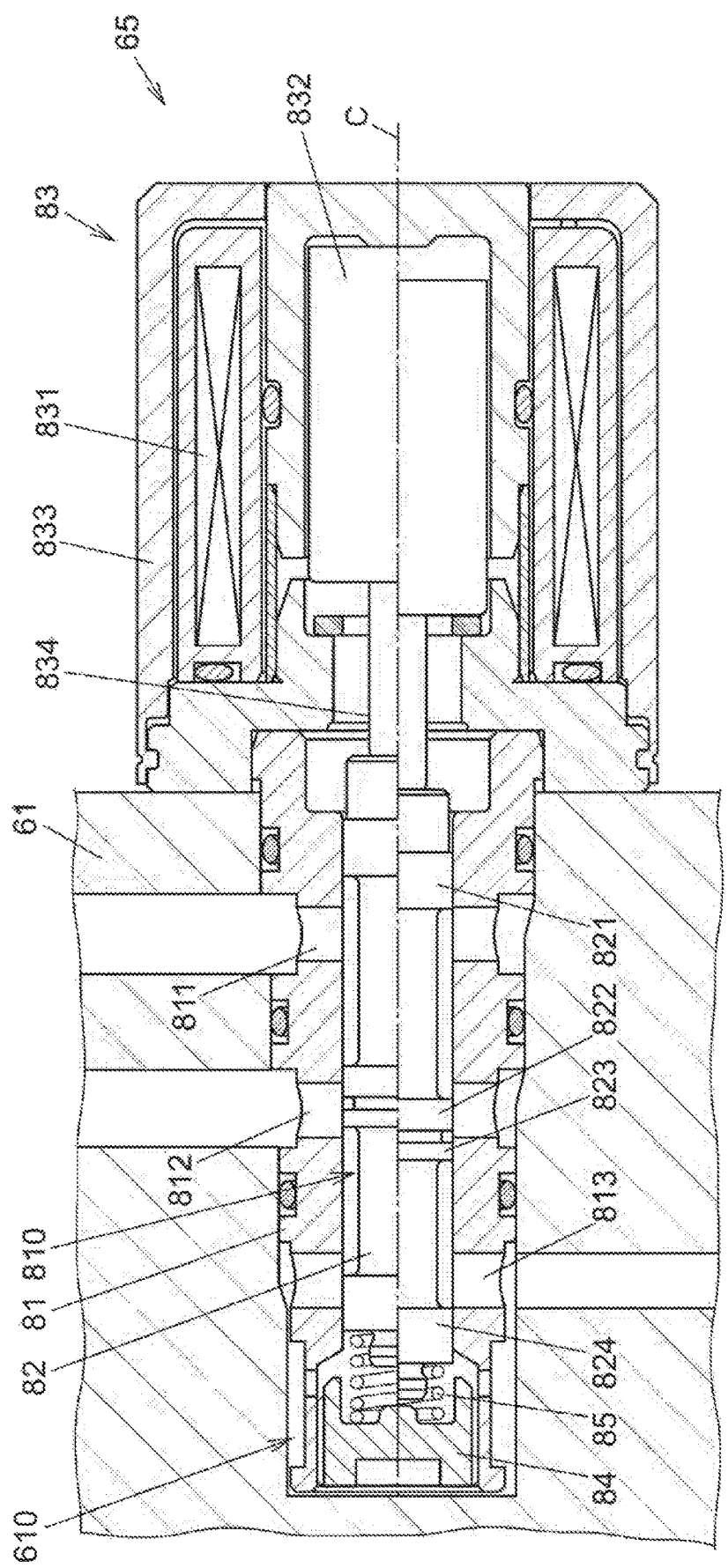
FIG. 4 is a sectional view illustrating an example of the configuration of a first electromagnetic valve.

FIG. 4 is a sectional view illustrating an example of the configuration of the first electromagnetic valve 65. The second electromagnetic valve 66 is also configured similarly. The first electromagnetic valve 65 includes a tubular sleeve 81 housed in a housing hole 610 provided in the case member 61; a spool 82 as a valve element that is movable in the axial direction in a valve hole 810 provided in the sleeve 81; and an electromagnetic solenoid 83 that projects from the case member 61. In FIG. 4, a central axis C of the valve hole 810 is indicated by alternate long and short dash lines, a state in which the spool 82 is moved to one side in the axial direction is illustrated on the lower side of the drawing with respect to the central axis C, and a state in which the spool 82 is moved to the other side in the axial direction is illustrated on the upper side of the drawing with respect to the central axis C.

The sleeve 81 is provided with a supply port 811 to which operating oil discharged from the hydraulic pump 63 is supplied; an output port 812 from which operating oil is output to the first hydraulic chamber 550; and a discharge port 813 connected to the reservoir 60. The spool 82 is provided with first to fourth lands 821 to 824 that face the inner peripheral surface of the valve hole 810 via a slight gap. An end of the sleeve 81 on the opposite side from the electromagnetic solenoid 83 is closed by a lid body 84. A coil spring 85 is disposed in a compressed state between the lid body 84 and the spool 82.

The electromagnetic solenoid 83 includes an electromagnetic coil 831 that generates a magnetic force using a current supplied from the control device 7; a plunger 832 that presses the spool 82 toward the lid body 84 using the magnetic force of the electromagnetic coil 831; a solenoid housing 833 that houses the electromagnetic coil 831 and the plunger 832; and a shaft 834 interposed between the plunger 832 and the spool 82. The spool 82 is positioned at a position at which the pressing force of the plunger 832 which is received via the shaft 834 and a spring force received from the coil spring 85 are balanced with each other.

When a current supplied to the electromagnetic coil 831 is varied, the position of the spool 82 in the valve hole 810 is varied to vary the area of a flow path for operating oil between the supply port 811 and the output port 812 and the area of a flow path for operating oil between the output port 812 and the discharge port 813. Consequently, the pressure of operating oil output from the output port 812 is varied. In other words, the control device 7 can control the pressure of operating oil in the first hydraulic chamber 550 by increasing and decreasing a current supplied to the first electromagnetic valve 65. Similarly, the control device 7 can control the pressure of operating oil in the second hydraulic chamber 540 by increasing and decreasing a current supplied to the second electromagnetic valve 66.

When operating oil is supplied from the hydraulic unit 6 to the first hydraulic chamber 550, the piston 451 of the first pressing mechanism 45 presses the first multi-plate clutch 43 toward the center plate 403 with a pressing force that matches the pressure of the operating oil. A drive force (clutch torque) transferred from the input rotary member 40 to the first output rotary member 41 by the first multi-plate clutch 43 is varied in accordance with the pressure of operating oil supplied to the first hydraulic chamber 550.

When operating oil is supplied from the hydraulic unit 6 to the second hydraulic chamber 540, the piston 461 of the second pressing mechanism 46 presses the second multi-plate clutch 44 toward the center plate 403 with a pressing force that matches the pressure of the operating oil. A drive force (clutch torque) transferred from the input rotary member 40 to the second output rotary member 42 by the second multi-plate clutch 44 is varied in accordance with the pressure of operating oil supplied to the second hydraulic chamber 540.

Figure 5B:
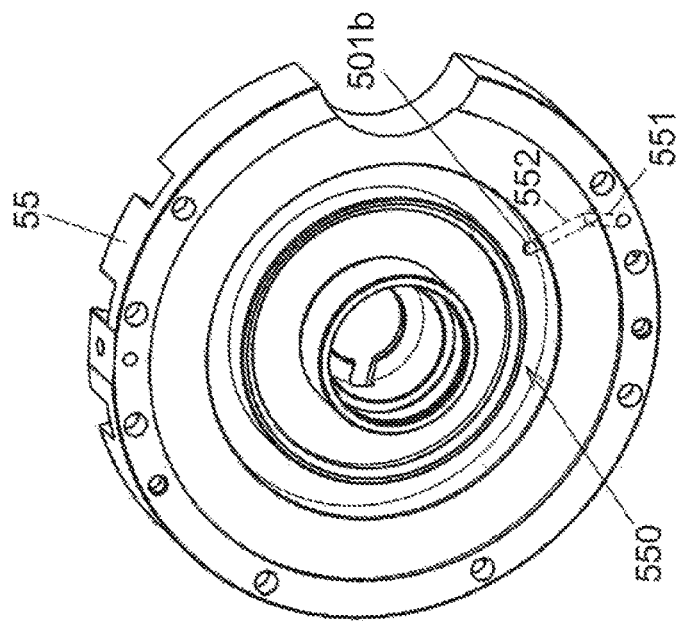
FIG. 5B is a perspective view illustrating a fifth housing member.
Figure 5A:
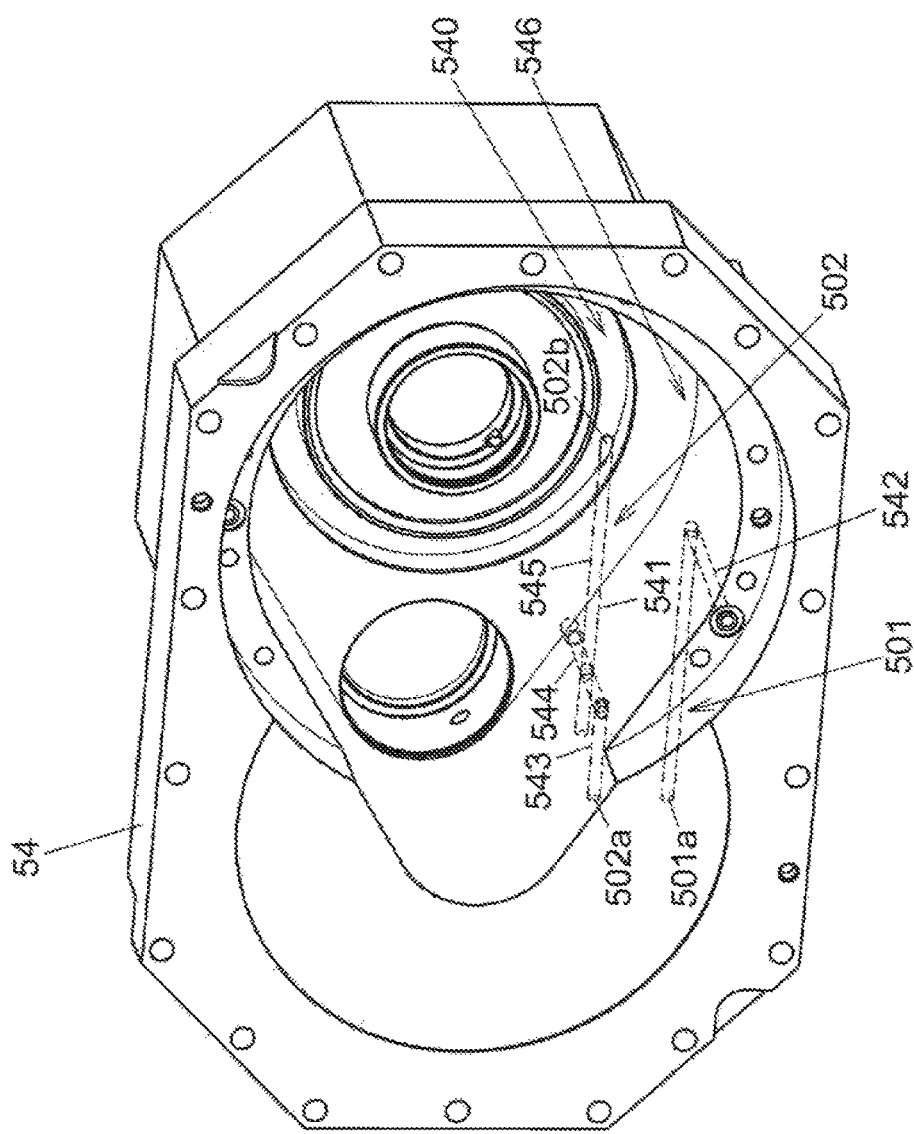
FIG. 5A is a perspective view illustrating a fourth housing member.

FIG. 5A is a perspective view illustrating the fourth housing member 54. FIG. 5B is a perspective view illustrating the fifth housing member 55. The right side of FIG. 5A corresponds to the front side in the vehicle front-rear direction. The left side of FIG. 5A corresponds to the rear side in the vehicle front-rear direction. The right side of FIG. 5 corresponds to the rear side in the vehicle front-rear direction. The left side of FIG. 5B corresponds to the front side in the vehicle front-rear direction. The upper side of FIGS. 5A and 5B corresponds to the upper side in the vertical direction. The lower side of FIGS. 5A and 5B corresponds to the lower side in the vertical direction.

In FIGS. 5A and 5B, a first oil path 501 through which operating oil is led from the hydraulic unit 6 to the first hydraulic chamber 550 and a second oil path 502 through which operating oil is led from the hydraulic unit 6 to the second hydraulic chamber 540 are illustrated with dashed lines. In FIG. 2, the first oil path 501 and the second oil path 502 are schematically illustrated as cross-hatched.

The first oil path 501 includes a first oil hole 541 and a second oil hole 542 provided in the fourth housing member 54 and a third oil hole 551 and a fourth oil hole 552 provided in the fifth housing member 55. The first oil hole 541 has an introduction port 501*a* which is coupled to the hydraulic unit 6 and through which operating oil output from the first electromagnetic valve 65 is introduced, and the first oil hole 541 extends toward the front side of the vehicle from the introduction port 501*a*. The second oil hole 542 communicates with the first oil hole 541, and extends toward the right side of the vehicle. The third oil hole 551 communicates with the second oil hole 542, further extends toward the right side of the vehicle, and communicates with the lower end portion of the fourth oil hole 552. The fourth oil hole 552 communicates with the third oil hole 551, and extends upward. The upper end portion of the fourth oil hole 552 serves as an emission port 501*b* that opens in the first hydraulic chamber 550.

The second oil path 502 includes fifth to seventh oil holes 543 to 545 provided in the fourth housing member 54. The fifth oil hole 543 has an introduction port 502*a* which is coupled to the hydraulic unit 6 and through which operating oil output from the second electromagnetic valve 66 is introduced, and the fifth oil hole 543 extends toward the front side of the vehicle from the introduction port 502*a*. The sixth oil hole 544 intersects the fifth oil hole 543 and the seventh oil hole 545, and extends in the vehicle right-left direction. The seventh oil hole 545 extends in the vehicle front-rear direction in parallel with the fifth oil hole 543. An end portion of the seventh oil hole 545 at the front side in the vehicle front-rear direction serves as an emission port 502*b* that opens in the second hydraulic chamber 540. First end portions of the sixth oil hole 544 and the seventh oil hole 545 are respectively closed by spherical plug bodies 572 and 573 (see FIG. 2).

The lubricating oil which lubricates the first and second multi-plate clutches 43 and 44 and the operating oil which operates the first and second pressing mechanisms 45 and 46 are separated so as not to be mixed with each other. As illustrated in FIG. 5A, the lower end portion of the fourth housing member 54 serves as an oil reservoir 546 in which lubricating oil is accumulated, and the first oil hole 541, the second oil hole 542, and the fifth to seventh oil holes 543 to 545 are provided in the vicinity of the oil reservoir 546. In addition, the first oil hole 541, the second oil hole 542, and the fifth to seventh oil holes 543 to 545 are provided below an oil surface of lubricating oil at a stationary time when rotation of the input rotary member 40 and the first and second output rotary members 41 and 42 is stopped. Consequently, when the temperature of lubricating oil is raised by frictional heat generated by the first and second multi-plate clutches 43 and 44, the heat is conducted through the fourth housing member 54 to raise the temperature of operating oil.

In general, the pressure of operating oil output from an output port of an electromagnetic valve that includes a valve element (spool) operated by an electromagnetic solenoid is fluctuated in accordance with the temperature of the operating oil, even when a current supplied to the electromagnetic solenoid and the pressure of operating oil supplied to a supply port of the electromagnetic valve are constant. Therefore, it is desirable to correct a control amount for the hydraulic unit 6 in accordance with the temperature of the operating oil. In the present embodiment, the control device 7 performs a temperature estimation based on operation of the hydraulic unit 6, and corrects the control amount for the hydraulic unit 6 based on the result of the temperature estimation. Specifically, the amounts of currents supplied to the first and second electromagnetic valves 65 and 66 are corrected. The control process performed by the control device 7 will be described in detail below.

Figure 6:
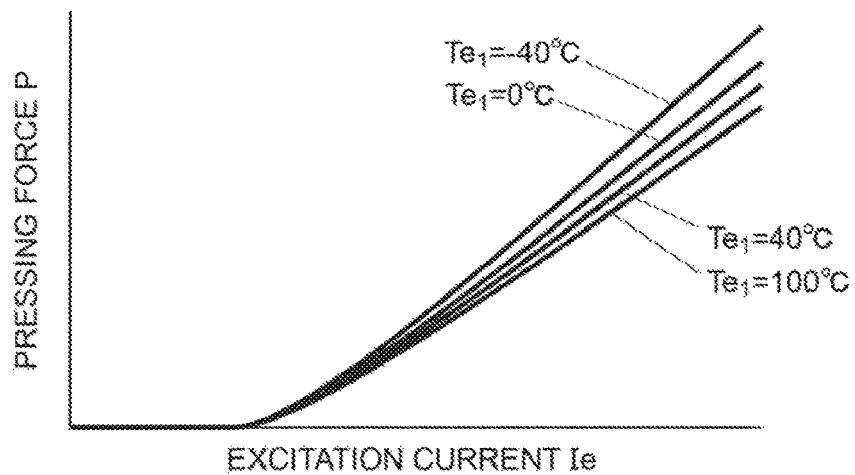
FIG. 6 is a graph representing first temperature characteristics.

FIG. 6 is a graph representing first temperature characteristics that indicate the relationship between an excitation current Ie for the electromagnetic coil 831 supplied to the electromagnetic solenoid 83 of the first electromagnetic valve 65 and a pressing force P generated by the piston 451 of the first pressing mechanism 45 in the cases where the pressure of operating oil supplied to the supply port 811 is constant and a temperature $Te_1$ of the operating oil is −40° C., 0° C., 40° C., and 100° C. As indicated in FIG. 6, the pressing force P increases substantially in proportion to the excitation current Ie, and the pressing force P is larger in the case where the temperature $Te_1$ of the operating oil is low than that in the case where the temperature $Te_1$ is high.

Figure 7:
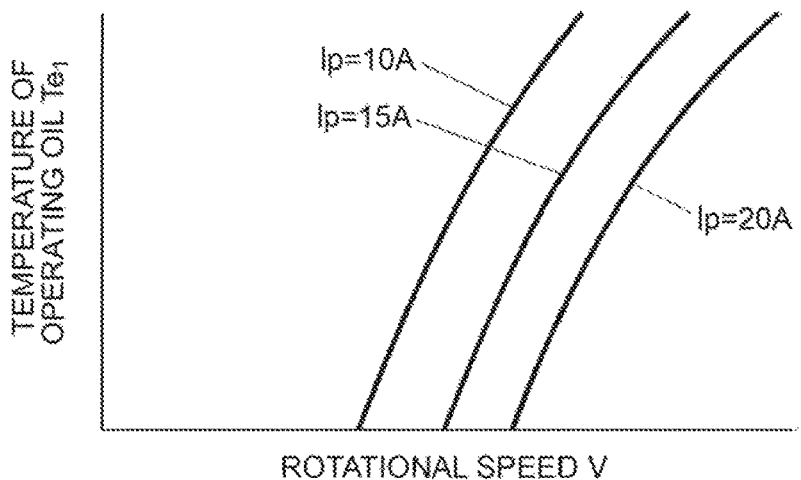
FIG. 7 is a graph representing second temperature characteristics.

FIG. 7 is a graph representing second temperature characteristics that indicate the relationship between a rotational speed V of the electric motor 62 and the temperature $Te_1$ of operating oil in the cases where a phase current Ip supplied to the electric motor 62 is 10 A, 15 A, and 20 A. As the temperature $Te_1$ of operating oil is higher, the viscous drag (i.e., viscosity resistance) of the operating oil is lower, and the load for driving the hydraulic pump 63 is lower. Thus, the rotational speed V of the electric motor 62 is higher as the temperature $Te_1$ of the operating oil is higher, even when the phase current is constant. Therefore, the control device 7 can estimate the temperature $Te_1$ of the operating oil based on the magnitude of the phase current and the rotational speed V of the electric motor 62.

The control device 7 stores, in a non-volatile memory, the first temperature characteristics indicated in FIG. 6 and the second temperature characteristics indicated in FIG. 7 as map information. The control device 7 estimates the temperature $Te_1$ of operating oil based on the second temperature characteristics, and corrects the excitation current Ie based on the estimated temperature $Te_1$ and the first temperature characteristics such that a necessary pressing force P can be obtained. Consequently, fluctuations in the pressing force P due to variations in the temperature $Te_1$ of operating oil can be restrained. The phase current of the electric motor 62 may also be corrected as the control amount for the hydraulic unit 6, along with correcting the excitation current Ie.

In the present embodiment, furthermore, the control device 7 controls the hydraulic unit 6 so as to restrain fluctuations in clutch torque due to variations in the temperature of lubricating oil, that is, fluctuations in torque transferred through the first multi-plate clutch 43 and torque transferred through the second multi-plate clutch 44. For this control, the control device 7 stores, in a non-volatile memory, third temperature characteristics indicated in FIG. 8 as map information.

Figure 8:
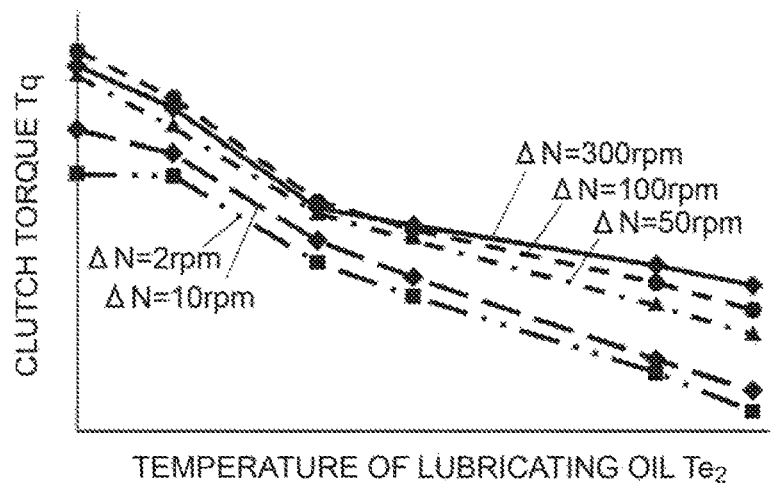
FIG. 8 is a graph representing third temperature characteristics.

FIG. 8 is a graph representing the third temperature characteristics which indicate the relationship between a temperature $Te_2$ of lubricating oil and clutch torque Tq in the case where the pressing force P of the piston 451 is constant for the first multi-plate clutch 43, with regard to each rotational speed difference ΔN per unit time between the input rotary member 40 and the first output rotary member 41. FIG. 8 indicates the relationship between the temperature $Te_2$ of lubricating oil and the clutch torque Tq in the cases where the rotational speed difference ΔN is 2 rpm, 10 rpm, 50 rpm, 100 rpm, and 300 rpm. The control device 7 stores the third temperature characteristics with regard to a plurality of values of the pressing force P. The rotational speed of the input rotary member 40 can be calculated based on the rotational speed of the drive motor 2 and the speed reduction ratio of the speed reduction mechanism 3. The rotational speed of the first output rotary member 41 can be calculated based on the rotational speed of the right rear wheel 103, for example.

As indicated in FIG. 8, the clutch torque Tq is larger as the temperature $Te_2$ of lubricating oil is lower, and is larger as the rotational speed difference ΔN is larger. As discussed earlier, heat of lubricating oil is conducted to operating oil, and thus it is considered that there is no significant deviation between the temperature $Te_2$ of lubricating oil and the temperature $Te_1$ of operating oil. The precision of a drive force transferred to the first output rotary member 41 through the first multi-plate clutch 43 can be enhanced by referring to the third temperature characteristics while considering that the temperature $Te_2$ of lubricating oil and the temperature $Te_1$ of operating oil coincide with each other, and controlling the hydraulic unit 6 such that the drive force to be transferred to the first output rotary member 41 matches the clutch torque of the first multi-plate clutch 43. In addition, the control device 7 can also enhance the precision of a drive force transferred to the second output rotary member 42 through the second multi-plate clutch 44 in a similar manner.

The functions and the effects of the first embodiment will be described. In the first embodiment described above, the control device 7 performs a temperature estimation based on operation of the hydraulic unit 6, and corrects the control amount for the hydraulic unit 6 based on the result of the temperature estimation. Thus, it is possible to improve the precision of a drive force transferred to the first output rotary member 41 through the first multi-plate clutch 43 and a drive force transferred to the second output rotary member 42 through the second multi-plate clutch 44.

Next, a second embodiment of the disclosure will be described. In the first embodiment, by way of example, the hydraulic unit 6 is controlled while considering that the temperature $Te_2$ of lubricating oil and the temperature $Te_1$ of operating oil coincide with each other. In the second embodiment, however, the temperature of operating oil is estimated and the temperature of lubricating oil is estimated based on the estimated temperature of operating oil when the engine 11 is started, that is, when ignition is turned on. It is considered that when the engine 11 is started, that is, when ignition is turned on, the degree of coincidence between the temperature of lubricating oil and the temperature of operating oil is particularly high. Thereafter, the temperature of lubricating oil in each of the first multi-plate clutch 43 and the second multi-plate clutch 44 is estimated based on the heat generation amount (i.e., an amount of generated heat) and the heat release amount (i.e., an amount of released heat) of a corresponding one of the first multi-plate clutch 43 and the second multi-plate clutch 44.

Figure 9:
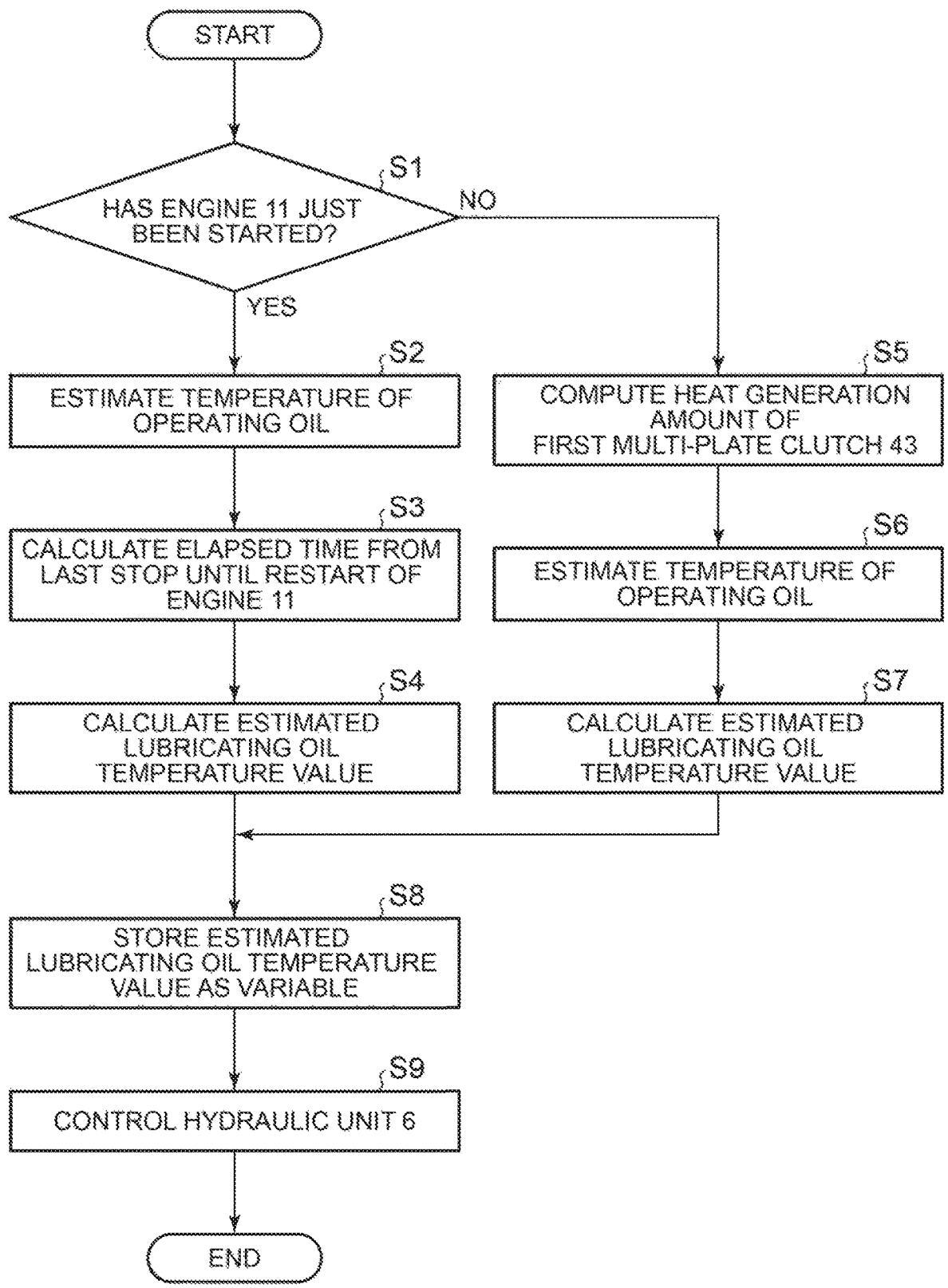
FIG. 9 is a flowchart illustrating a specific example of a process executed by a control device according to a second embodiment.

FIG. 9 is a flowchart illustrating a specific example of a process executed by the control device 7 according to the second embodiment. The control device 7 repeatedly executes the process illustrated in the flowchart in each predetermined control cycle (e.g. 5 ms). While FIG. 9 illustrates a process for controlling a drive force transferred through the first multi-plate clutch 43, a similar process is performed also for the second multi-plate clutch 44.

In the process illustrated in the flowchart, the control device 7 first determines whether the engine 11 has just been started, more specifically whether the time since the time when ignition is turned on is equal to or shorter than a predetermined time (step S1). In the case where the result of the determination indicates that the engine 11 has just been started (S1: Yes), the temperature of operating oil is estimated based on operation of the hydraulic unit 6 (step S2) in the same manner as in the first embodiment.

Next, the control device 7 calculates the elapsed time (hereinafter referred to as an "engine-off time") from the last stop until restart of the engine 11 (step S3), and calculates an estimated value (hereinafter referred to as an "estimated lubricating oil temperature value") of the temperature of lubricating oil in the first multi-plate clutch 43 (step S4) based on the temperature of operating oil estimated in step S2 and the engine-off time calculated in step S3. Specifically, the temperature of operating oil estimated in step S2 is used without change, as the estimated lubricating oil temperature value when the engine-off time is longer than a predetermined value, and the estimated lubricating oil temperature value is computed based on the temperature of operating oil at the time of the last stop of the engine 11 in consideration of the engine-off time and the outside air temperature when the engine-off time is equal to or shorter than the predetermined value.

In the case where the result of the determination in step S indicates that the engine 11 has not just been started (S1: No), the control device 7 computes the heat generation amount of the first multi-plate clutch 43 (step S5) based on the drive force transferred through the first multi-plate clutch 43 and the rotational speed difference $\Delta N$, and subsequently estimates the temperature of operating oil based on operation of the hydraulic unit 6 (step S6). Next, the control device 7 calculates an estimated lubricating oil temperature value using the following expression (1)(step S7).

$$Tmp = Tmp_1 + K_1 \times H - K_2 \times (Tmp_1 - Te_1) \quad (1)$$

In the expression, Tmp is an estimated lubricating oil temperature value in the current control cycle, $Tmp_1$ is an estimated lubricating oil temperature value in the preceding control cycle, $K_1$ and $K_2$ are each a conversion coefficient, H is the heat generation amount calculated in step S5, and $Te_1$ is the temperature of operating oil estimated in step S6.

In the above expression (1), the term $K_2 \times (Tmp_1 - Te_1)$ indicates the heat release amount. That is, lubricating oil is accommodated in the housing 5, and operating oil is present in the first and second oil paths 501 and 502 which are provided in the housing 5 and the reservoir 60 which is housed in the case member 61 which is outside the housing 5. Thus, operating oil is more susceptible to the outside air temperature and air received as the vehicle travels than lubricating oil is, and the heat release amount of lubricating oil can be estimated by multiplying a difference, which is obtained by subtracting the temperature of operating oil from the temperature of lubricating oil, by a predetermined coefficient.

Next, the control device 7 stores the estimated lubricating oil temperature value calculated in step S4 or step S7 as a variable to be used for computation in the next control cycle (step S8). In addition, the control device 7 controls the hydraulic unit 6 (step S9) by referring to the first to third temperature characteristics as in the first embodiment, based on the estimated lubricating oil temperature value calculated in step S4 or step S7.

With the second embodiment, it is possible to further improve the precision of the drive force transferred to the first output rotary member 41 through the first multi-plate clutch 43 and the drive force transferred to the second output rotary member 42 through the second multi-plate clutch 44.

While the disclosure has been described above based on the embodiments, such embodiments do not limit the disclosure. It should be noted that not all the combinations of the characteristics described in relation to the embodiments are essential to address the issue of the disclosure.

The disclosure can be modified, as appropriate, without departing from the scope of the disclosure. For example, in the embodiments described above, the front wheels 101 and 102 are driven by the engine, and the rear wheels 103 and 104 are driven by the drive device 10. However, the configuration of the vehicle is not limited thereto, and the drive device 10 according to the disclosure is applicable to vehicles with various configurations. For example, the disclosure is also applicable to a four-wheel-drive vehicle in which a drive force of an engine is distributed to the right and left front wheels and the right and left rear wheels.

In the embodiments described above, the drive device 10 includes two multi-plate clutches (first and second multi-plate clutches 43 and 44). However, a drive force transferred via one multi-plate clutch may be distributed to right and left wheels through a differential device.

In the embodiments described above, the case member 61 of the hydraulic unit 6 is separated from the housing 5, and the hydraulic unit 6 is disposed outside the housing 5. However, the disclosure is not limited thereto. For example, some or all of the first and second electromagnetic valves 65 and 66, the hydraulic pump 63, and the electric motor 62 may be housed in the housing 5.

What is claimed is:
1. A drive force transfer device comprising:
   a multi-plate clutch that transfers a drive force using a friction force generated between a plurality of clutch plates;
   a housing that houses the multi-plate clutch;
   a piston that presses the multi-plate clutch using a hydraulic pressure of operating oil supplied to a hydraulic chamber provided in the housing;
   a hydraulic unit configured to supply the operating oil to the hydraulic chamber, the hydraulic unit including a hydraulic pump, an electric motor that drives the hydraulic pump, and an electromagnetic valve that regulates the hydraulic pressure of the operating oil that is supplied from the hydraulic pump to the hydraulic chamber; and
   a control device configured to control the hydraulic unit,
   wherein frictional sliding of the clutch plates of the multi-plate clutch is lubricated by lubricating oil sealed in the housing,
   wherein the housing is provided with an oil path that leads the operating oil from the hydraulic unit to the hydraulic chamber, and
   wherein the control device is configured to
      determine whether an engine has just been started,
      when it is determined that the engine has just been started, estimate a temperature of the operating oil based on a magnitude of a phase current supplied to the electric motor and a rotational speed of the electric motor, calculate an elapsed time from a last stop until restart of the engine, and estimate a tem- perature of the lubricated oil based on the estimated temperature of the operating oil and the elapsed time, when it is determined that the engine has not just been started, calculate a heat generation amount and a heat release amount of the multi-plate clutch, estimate the temperature of the operating oil based on a magnitude of a phase current supplied to the electric motor and a rotational speed of the electric motor, and estimate the temperature of lubricated oil based on the estimated temperature of the operating oil and the heat generation amount and the heat release amount of the multi-plate clutch, store the estimated temperature of the lubricated oil as a variable, and correct a control amount for operation of the electromagnetic valve of the hydraulic unit based on the estimated temperature of the lubricated oil.

2. The drive force transfer device according to claim 1, wherein:
the electromagnetic valve includes an electromagnetic solenoid and a valve element operated by the electromagnetic solenoid; and
the control device is configured to correct at least an amount of a current supplied to the electromagnetic solenoid as the control amount.

3. The drive force transfer device according to claim 1, wherein:
the multi-plate clutch is disposed between an input rotary member and an output rotary member that is coaxial with and relatively rotatable with the input rotary member, and
the temperature of the lubricating oil is estimated based on a rotational speed difference per unit time between the input rotary member and the output rotary member.

* * * * *